C. LE G. FORTESCUE.
ELECTRICAL PROTECTIVE DEVICE.
APPLICATION FILED OCT. 6, 1916.

1,358,718. Patented Nov. 16, 1920.

WITNESSES:
P. J. Fitzgerald
J. H. Procter

INVENTOR
Charles Le G. Fortescue.
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

1,358,718.   Specification of Letters Patent.   Patented Nov. 16, 1920.

Application filed October 6, 1916. Serial No. 124,055.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Electrical Protective Devices, of which the following is a specification.

My invention relates to electrical protective devices and particularly to means for protecting electrical translating devices in accordance with the temperature thereof.

One object of my invention is to provide an electrical protective device that shall be adapted to operate only when the mean temperature of the translating device that is to be protected reaches a predetermined value.

Another object of my invention is to provide means that shall be connected between equal-potential points of the windings of the translating device and adapted to respond only to changes in the resistance of the said windings.

U. S. Patent No. 1,210,058, granted to me December 26, 1916, on an application filed September 21, 1915, discloses an electrical protective device comprising two parallel-connected resistors that are adapted to be heated in accordance with the temperature of the translating device which is to be protected. Electro-responsive means is connected between equal-potential points of the resistors and adapted to be actuated when the temperature of the device exceeds a predetermined value.

In my present invention, I connect the electro-responsive means to equal-potential points of the windings of the translating device and thus cause the electro-responsive device to be actuated only when the mean temperature of the windings exceeds a predetermined value.

Figure 1:
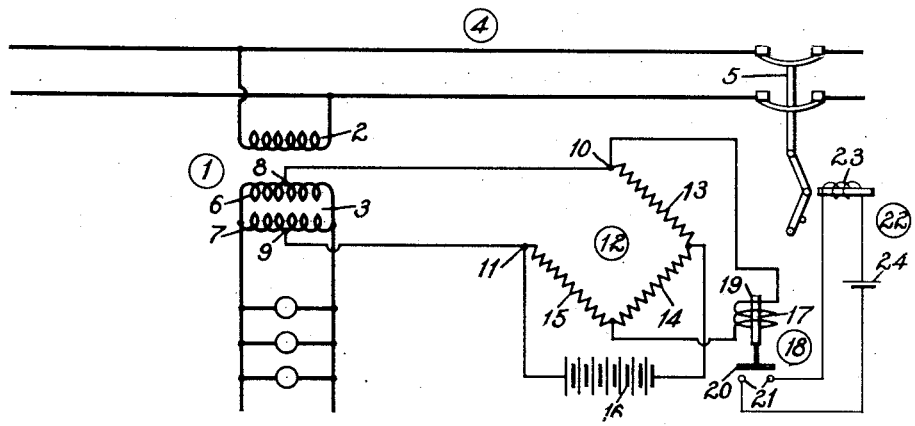
Figure 2:
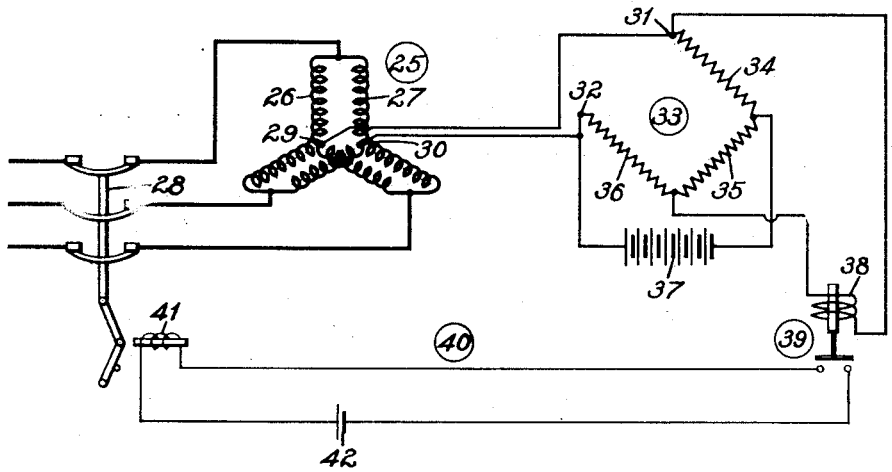

In the accompanying drawings, Figure 1 is a diagrammatic view of a transformer embodying my invention and Fig. 2 is a diagrammatic view of another form of translating device embodying my invention.

A transformer 1 having a primary winding 2 and a parallel-connected secondary winding 3 is operatively connected to an electric circuit 4 that is provided with a circuit interrupter 5 which is adapted to be tripped when the mean temperature of the transformer 1 exceeds a predetermined value. The secondary winding 3 of the transformer 1 comprises two parallel-connected symmetrical windings 6 and 7 the equal-potential points 8 and 9 of which are connected to the terminals 10 and 11 of a Wheatstone bridge 12 that comprises resistors 13, 14 and 15, a source 16 of electromotive force and the winding 17 of a relay 18. The resistance between the points 8 and 9 of the secondary winding 3 of the transformer 1 constitutes one arm of the Wheatstone bridge 12 which is so proportioned that, when the resistance of the windings 6 and 7 reach predetermined values because of the excessive current traversing the same, no current will traverse the winding 17 of the relay 18. The relay 18 comprises the winding 17, a movable core member 19, a movable bridging contact member 20 and stationary contact members 21. The stationary contact members 21 constitute the terminals of a circuit 22 comprising a trip coil 23 and a source 24 of electromotive force.

Under normal conditions of operation of the transformer 1, sufficient current will traverse the winding 17 to cause the movable contact member 20 to remain out of engagement with its stationary contact members 21. However, when sufficient current traverses the transformer 1 to cause the mean temperature of the windings to rise to a dangerous value, the resistance between the points 8 and 9 of the windings 6 and 7, respectively, will increase to cause the Wheatstone bridge 12 to become so balanced that no current traverses the winding 17. This will cause the movable bridging contact member 20 to engage the stationary contact members 21 and the trip coil 23 to be sufficiently energized to trip the circuit interrupter 5.

In Fig. 2 of the drawings, a dynamo-electric machine 25 is provided with parallel-connected symmetrical windings 26 and 27 and is adapted to be protected by a circuit interupter 28 when its mean temperature exceeds a predetermined value. The neutral or equal-potential points 29 and 30 of the windings 26 and 27, respectively, are connected to the terminals 31 and 32 of a Wheatstone bridge 33. The Wheatstone bridge 33 comprises resistors 34, 35 and 36, a source 37 of electromotive force and the winding 38 of a relay 39. The resistance between the points 29 and 30 constitutes one arm of the Wheatstone bridge 33. The relay 39 is adapted to complete a circuit 40 comprising the trip coil 41 of the circuit interrupter 38 and a source 42 of electromotive force when the mean temperature of the windings 26 and 27 exceeds a predetermined value. That is, the Wheatstone bridge 33 is so proportioned that, under normal conditions of operation, sufficient current will traverse the winding 38 to cause its movable contact member to disengage its stationary contact members. However, when the resistance between the points 29 and 30 increases, by reason of the increased current traversing the windings 26 and 27, the bridge 33 will become so balanced, under predetermined conditions, that insufficient current will traverse the winding 38 to hold its movable core member in its upper positions. Thus, when the mean temperature of the windings 26 and 27 exceeds a predetermined value, the circuit interrupter 28 will be tripped.

I do not limit my invention to the particular translating devices or electro-responsive devices illustrated, as it may be variously modified without departing from the spirit and scope of the invention as set forth in the appended claims.

I claim as my invention:

1. The combination with a translating device having parallel-connected windings, of an electrical device comprising the resistance of the windings between the equal-potential points thereof.

2. The combination with a translating device, of a Wheatstone bridge one arm of which comprises the resistance of the active windings of the translating device between equal-potential points thereof.

3. The combination with a translating device having two parallel-connected windings, and a protective device therefor, of a Wheatstone bridge one arm of which comprises the resistance between two equal-potential points of the windings and means connected to the bridge for controlling the protective device.

4. The combination with an electrical translating device having parallel-connected actuating windings, of a relay system connected to the equal-potential points of the windings and arranged to be actuated when the resistance included between the equal-potential points reaches a predetermined value.

5. The combination with a translating device having parallel-connected windings, and a protective device therefor, of means connected across the equal-potential points of the windings for controlling the protective device.

6. The combination with a translating device having parallel-connected active windings, of a Wheatstone bridge one arm of which comprises the resistance of the windings between equal-potential points thereof.

7. The combination with a translating device having parallel-connected windings, and a protective device therefor, of means connected across the equal-potential points of the windings for actuating the protective device when the temperature of the windings reach a predetermined value.

8. The combination with a translating device having parallel-connected windings, and a protective device therefor, of means connected across the equal-potential points of the windings for actuating the protective device when the resistance included between the equal-potential points reaches a predetermined value.

9. The combination with a transformer having two parallel-connected windings and a protective device therefor, of means connected across equal-potential points of the transformer for actuating the protective device under predetermined temperature conditions.

10. The combination with a transformer having two parallel-connected windings, of a Wheatstone bridge one arm of which comprises the resistance of the windings between equal-potential points thereof, and a protective device for the transformer controlled by the bridge.

11. The combination with a transformer having two parallel-connected windings, of a Wheatstone bridge device one arm of which comprises the resistance of the windings between equal-potential points thereof.

In testimony whereof I have hereunto subscribed my name this 29th day of Sept. 1916.

CHARLES LE G. FORTESCUE.